L. C. MARSHALL.
PISTON PACKING.
APPLICATION FILED AUG. 25, 1919.

1,413,922.

Patented Apr. 25, 1922.

Inventor
Lewis C. Marshall
by Roberts-Roberts & Cushman
his Attorneys

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

1,413,922.  Specification of Letters Patent.  Patented Apr. 25, 1922.

Application filed August 25, 1919. Serial No. 319,749.

*To all whom it may concern:*

Be it known that I, LEWIS C. MARSHALL, a citizen of the United States, and resident of Walpole, in the county of Norfolk and State of Massachusetts, have invented new and useful Improvements in Piston Packings, of which the following is a specification.

This invention relates to piston packings and while adapted to the packing of pistons generally, it is especially designed for the packing of pistons of internal combustion engines. In such engines in operation the cylinder is cooled while the piston is hot and the latter therefore expands more than the cylinder and must fit loosely within the cylinder to avoid binding. In order to maintain the high compression which is necessary, the piston is provided with packing rings which not only must fit tightly against the cylinder wall, but must make a tight joint with the grooves of the piston within which they are positioned, to prevent leakage underneath the piston rings. The rings should also be so constructed that they are pressed evenly throughout their circumferential surface against the cylinder wall to avoid an uneven wearing down of the rings or an uneven wearing of the cylinder which would tend to make the bore of the cylinder unsymmetrical.

The principal object of the present invention is to provide a novel and improved metallic piston packing which shall accomplish these results and which shall also be simple in construction and free from multiplicity of parts and complexity of construction.

In the accompanying drawings which illustrate an embodiment of the invention,—

Figure 1:
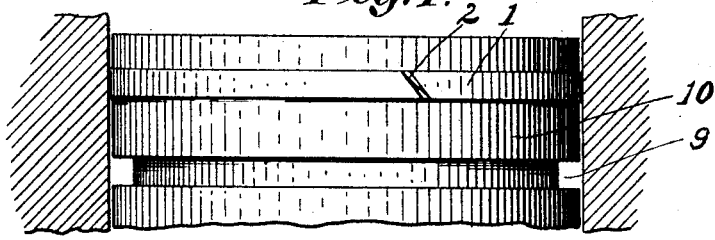
Figure 1 is a side elevation of the packing rings in place on a piston head.
Figure 2:
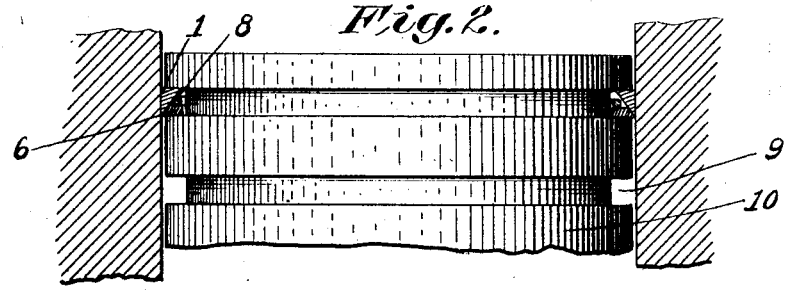
Figure 2 is a sectional view of said packing rings in place on a piston head.
Figure 3:
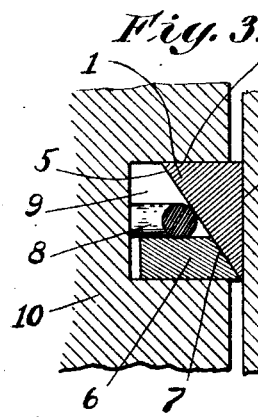
Figure 3 is an enlarged detail view in cross-section, illustrating the form of packing rings shown in Figs. 1 and 2.

Referring to Figures 1, 2 and 3 of the drawings, 1 represents a packing ring divided at a single point 2, but otherwise continuous, and preferably made of grey cast iron or other suitable material. This ring is triangular in cross-section as shown in Fig. 3, having its peripheral face 3 disposed at right angles to its face 4, and is preferably of the same external diameter as the cylinder bore. The inner face 5 of the ring 1 is beveled with respect to the peripheral face 3 at an angle, for example, of about 40°. A second ring 6 of cast iron or other suitable material is provided having a trapeziform cross-section, the outer face 7 of which is beveled at the same angle as the beveled face 5 of the ring 1 and is adapted to rest against face 5. The ring 6 is divided at only one point and is preferably so formed as to exert a slight pressure against the inner face of ring 1, although if desired the ring may be so formed as to be inert. The position of the rings 1 and 6 when assembled is best shown in Figs. 2 and 3. The spring ring 8 is a forcing or follower ring preferably of spring steel, divided at a single point and normally tending to urge the ring 1 outwardly against the cylinder wall and upwardly against the upper wall of the cylinder groove. The ring 8 rests upon the upper face of the ring 6 in contact with the central portion of the inner beveled face 5 of the ring 1. By so positioning the follower ring 8 that its expansive pressure is directed against the ring 1 in the region of its middle, the ring 1 is urged more evenly against the wall of the cylinder and the wear is more evenly distributed to its peripheral surface, than if the pressure of spring 8 were exerted substantially above or below the central part of ring 1. Furthermore any tendency of the ring to twist is overcome and the upper face of the ring is urged with an even bearing against the side wall of the piston groove.

The three rings are assembled in the circumferential groove 9 of the piston head 10 in such position that the lines of division of the rings break joint. When assembled in the groove of the piston head as shown in Figs. 1, 2 and 3, the ring 1 fits the cylinder bore and is urged into contact therewith by the follower ring 8. The ring 8, cooperating with the beveled surface 5 of the packing ring 1, by reason of its expansion makes a constant bearing engagement with the beveled surface 5. One component of the force being exerted against the beveled surface 5 tends to expand the ring 1 and thereby effect a tight closure between the periphery of the ring 1 and the cylinder wall; while the other component of said force tends to thrust said packing ring bodily endwise with relation to the piston head 10 and thereby hold the face 4 of the ring 1 in tight engagement with one wall of the groove 9. Thus the packing ring is maintained tight against loss of pressure both between the ring and the cylinder wall and underneath the ring between the ring and the piston groove.

The ring 6 serves to support the spring ring 8 in the region of the middle of ring 1, and also to prevent the ring 1 from tipping inwardly away from contact with the cylinder wall when there is any tendency of the ring to so tip under the influence of the follower ring 8. When the ring 6 is given resiliency of its own, it not only fulfills this function but through its beveled face 7 wedges itself between the beveled face 5 of the packing ring 1 and the lower wall of the groove 9, thereby maintaining a gas-tight joint between the ring 1 and the lower wall of the piston groove 9.

Figure 4:
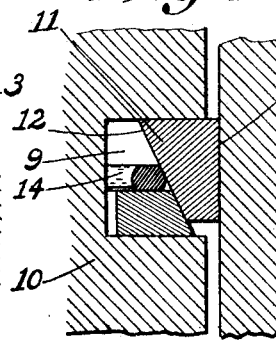
Figure 4 is an enlarged detail view in cross-section, illustrating a modification of the structure shown in Fig. 3.

The modified form of packing shown in Fig. 4 is substantially similar to the packing shown in Figs. 1, 2 and 3, but differs therefrom in that the packing ring 11 is trapeziform in cross-section and of less width than the groove 9 of the piston head. This form has some advantage over the form hereinbefore described in that the lower sharp edge of the ring is eliminated and the ring provided with a less pronounced bevel for the same depth of groove, i. e., the beveled face 12 is more nearly parallel with the outer peripheral face 13 of the ring. By providing less bevel to the face 12 the component of force exerted by the follower ring 14 tending to urge the packing ring 11 against the cylinder wall is increased, and the upward component tending to urge the ring against the wall of the groove is decreased, thereby insuring a tighter joint between the ring and the cylinder. The spring follower ring 14 in this modification is shown flattened on both sides.

Figure 5:
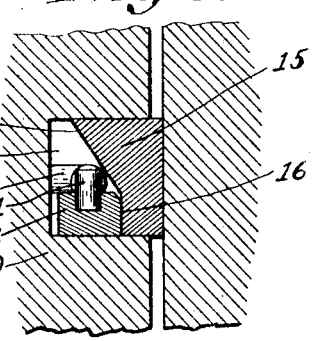
Figure 5 is an enlarged detail view in cross-section, illustrating a still further modification.

In Fig. 5, I have shown a further modified form of packing in which the packing ring 15 is formed with an inner face having a lower portion 16 thereof parallel with the outer face thereof, and an upper portion 17 beveled at an obtuse angle to the lower portion of the face. The ring 18 which bears against the lower portion 16 of the inner face of the ring 15 is rectangular in cross-section and of sufficient height to support the follower ring 19 substantially in the central region of the groove 9 where its expansive force will be applied against the beveled portion of the inner face of ring 15 opposite the central region of the ring. The ring 18 may or may not be made to exert an expansive pressure as desired; and the ring 19 as herein shown is flat on one side only.

Figure 7:
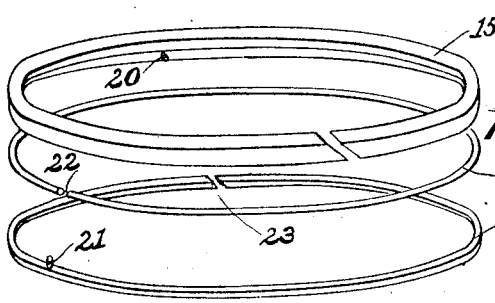
Figure 7 is a perspective view of the three rings which constitute the packing shown in Fig. 5.

As shown in Fig. 7 the clefts in the rings 15, 18 and 19 (and the corresponding clefts in the other modifications) are positioned substantially 90° from each other so that the rings are in broken joint relation to each other. They may be conveniently held in such relative positions by means of pins 20 and 21 carried by the rings 15 and 18 respectively and adapted to be positioned in the clefts 22 and 23 respectively of the rings 19 and 18. By thus positioning the rings with their clefts breaking joints at substantially 90° from each other, the packing ring 15 is forced outwardly with more nearly even pressure throughout its periphery and the tendency of the ring to expand into an elliptical form, thereby wearing the bore of the cylinder unevenly, is overcome.

Figure 6:
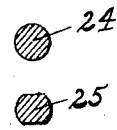
Figure 6 is a view showing cross-sections of different forms of steel expander rings which may be employed.
Figure 6:
Figure 6:
Figure 6:

In Fig. 6 I have illustrated several forms of spring follower rings by cross-sectional views thereof. The forms shown at 24, 25 and 26 are all made from round steel wire, the ring section 25 being made from wire ground or drawn flat on diametrically opposite sides, and the ring section 26 being made from wire ground or drawn flat on one side, the flat face of the ring being adapted to bear on the ring which supports it. The spring ring section 27 is triangular in outline and is beveled to correspond to the bevel of the packing ring against which it applies its expansive force.

I claim:

1. In combination with a piston having an annular groove, a packing in said groove comprising a packing ring having a beveled inner face, a second ring resting on the bottom side of said groove, and a spring follower ring supported within said groove by said second ring and engaging the beveled face of the packing ring.

2. In combination with a piston having an annular groove, a packing in said groove comprising a packing ring having a beveled inner face, a second ring resting on the bottom side of said groove and having an outer beveled face corresponding to the beveled face of the packing ring, and a spring follower ring supported within said groove by said second ring and engaging the beveled face of the packing ring.

3. In combination with a piston having an annular groove, a packing in said groove comprising a packing ring having a beveled inner face, a spring follower ring engaging said beveled face, and a supporting ring resting on the bottom of the groove adapted to support the spring follower ring opposite the central region of the packing ring.

4. A composite piston packing for use in the cylinders of internal combustion engines comprising a ring of substantially right-triangular section having a surface engageable with the cylinder wall, a second ring of trapeziform cross-section having the inclined face thereof in engagement with that side of said first ring which constitutes the hypotenuse of its triangular section and means for expanding said first ring.

5. In combination with a piston for use in an engine cylinder, said piston having an annular groove therein, a packing in said groove comprising a pair of rings, one of said rings extending substantially from one side wall of the groove to the other and having a surface for engagement with the cylinder wall, each of said rings having a surface engaging a side wall of the piston groove, and being also provided with surfaces which intersect each other at an acute angle, one of such intersecting surfaces being substantially parallel to the side wall of the piston groove, and an expander ring arranged within said angle and being supported upon said last named surface.

6. In combination with a piston for use in the cylinder of an internal combustion engine and having an annular groove therein, a piston ring of substantially triangular cross section having one side thereof in engagement with a side wall of the piston groove, and having a second side of a width substantially equal to that of the piston groove and constructed and arranged for engagement with a cylinder wall, a second ring having a surface in engagement with the other side wall of the groove, said rings having other faces intersecting each other at an acute angle, and an expander ring resting upon one of such intersecting faces and engaging the other thereof.

Signed by me at Boston, Massachusetts, this 1st day of August 1919.

LEWIS C. MARSHALL.